United States Patent

Cok et al.

[11] Patent Number: 5,963,214
[45] Date of Patent: Oct. 5, 1999

[54] METHOD OF COMBINING TWO DIGITAL IMAGES

[75] Inventors: Ronald Steven Cok; John Randall Fredlund, both of Rochester, N.Y.

[73] Assignee: Eastman Kodak Company, Rochester, N.Y.

[21] Appl. No.: 08/681,779

[22] Filed: Jul. 29, 1996

[51] Int. Cl.⁶ .................................................. G06F 15/00
[52] U.S. Cl. .......................................................... 345/435
[58] Field of Search ..................................... 345/435, 150, 345/117, 326, 328, 342, 333, 121, 118, 115, 113, 433, 127; 395/117

[56] References Cited

U.S. PATENT DOCUMENTS

| | | | |
|---|---|---|---|
| 5,347,622 | 9/1994 | Takemoto et al. | 395/135 |
| 5,414,529 | 5/1995 | Terada et al. | 358/448 |
| 5,459,819 | 10/1995 | Watkins et al. | 395/117 |
| 5,572,235 | 11/1996 | Mical et al. | 345/150 |
| 5,594,850 | 1/1997 | Noyama et al. | 395/135 |
| 5,623,587 | 4/1997 | Bulman | 395/135 |

*Primary Examiner*—Joseph H. Feild
*Assistant Examiner*—Alford W. Kindred
*Attorney, Agent, or Firm*—Frank Pincelli

[57] ABSTRACT

A method of combining at least one captured generated digital image with at least one prestored digital image. A prestored digital image having a predetermined location where a captured customer generated digital image may be placed is selected for merging with a digital customer generated image. The location of the prestored image has a predetermined visual aspect. The customer generated image is automatically modified in accordance with a predetermined visual aspect and merged into the prestored image so as to form a merged digital image.

5 Claims, 5 Drawing Sheets

METHOD OF COMBINING TWO DIGITAL IMAGES

FIELD OF THE INVENTION

This is directed to a system and method for producing customized images and merging at least two images obtained from different sources and printing the images on at least one output format.

BACKGROUND OF THE INVENTION

It is known from U.S. Pat. No. 5,459,819 that two individual images can be combined together to form a newly merged single image. Because the images are from two different sources, many visual aspects of one image may be in aesthetic conflict to that of the other. It is also often desirable to provide a particular visual effect with one of the images to be merged. Since the merging of the images is a relatively time consuming and expensive process in relationship to the cost of goods sold, it is important that this be done as effectively as possible so as to avoid any unnecessary recomposing and reprinting of the images.

In order to provide a more aesthetically appealing overall image, one of the images is modified in accordance with a particular mathematical relationship which represents a particular visual effect which matches a mathematical relationship of the other image.

SUMMARY OF THE INVENTION

In accordance with the present invention there is provided a method of combining at least one captured generated digital image with at least one prestored digital image, comprising the step of:

a) selecting a prestored digital image, the digital image having a predetermined location where a captured customer generated digital image may be placed, the location having a predetermined visual aspect; and b) automatically modifying the captured customer generated image in accordance with a predetermined visual aspect and integrating the modified captured customer generated digital image into the prestored image at the predetermined location so as to form a merged digital image.

DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
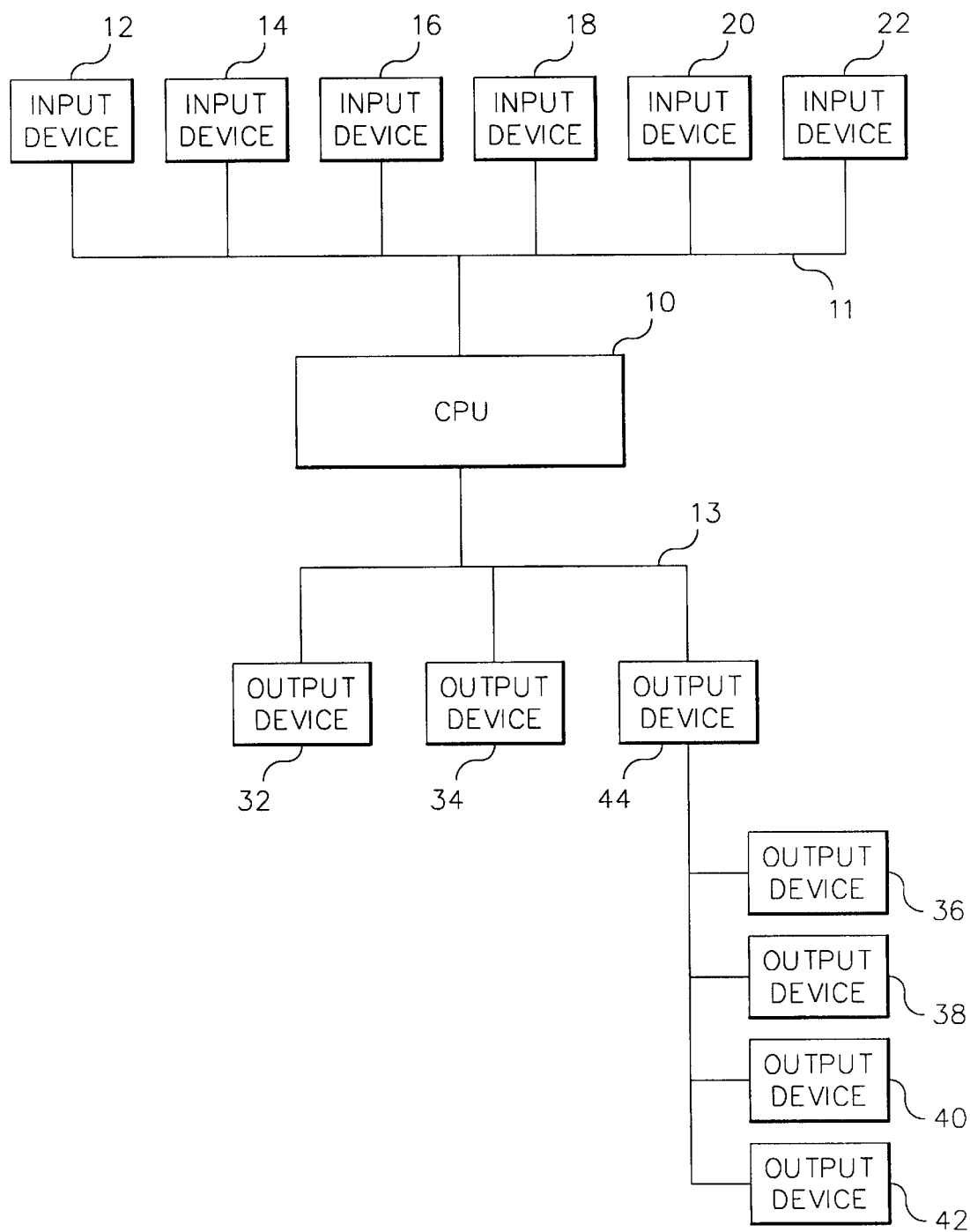
FIG. 1 is a schematic block diagram of a system made in accordance with the present invention.

Referring to FIG. 1, there is illustrated in block diagram form, a system for producing customized images and imprinting these customized images onto a variety of different formats. In particular, the system includes a central processing unit (CPU) 10 which can take the form of any appropriate computer. In the particular embodiment illustrated, the central processing unit 10 comprises an Apple Macintosh Computer which is used to control the various input and output devices. A plurality of input devices 12,14,16,18,20,22 are provided for generating an image in a digital format. In particular, first input device 12 comprises a scanner used to scan photographic negatives or slides, both color and monochrome. In the particular embodiment illustrated, the input device 12 comprises a Rapid Film Scanner 2035, made by the Eastman Kodak Company. The input device 12 scans the film and produces a digital output which is forwarded onto the central processing unit 10 by an appropriate data link system 11 for storage in memory and further manipulation. Likewise, input device 14 is provided for scanning of photographic pictures, printed or drawn, both color and/or monochrome, and producing a digitized signal which is representing the image scanned. The Coloredge Printer, sold by the Eastman Kodak Company, has a scanner built therein which is capable of scanning photographic pictures, or any type printed material, and providing the appropriate digital signal for the computer 10. The second input device 14 is appropriately connected to the CPU 10 such that the CPU may appropriately receive and manipulate the information obtained therefrom. Likewise, input devices 16,18,20,22 are provided for obtaining digital signals representative of an image from various sources. In particular, input device 16 is a video camera (where the output is digitized), and input device 18 comprises a CD (compact disc) reader for reading digitally stored information on a compact disc. Input device 20 comprises an electronic camera such as the DCS 200 Digital Camera, produced by the Eastman Kodak Company. Input device 22 may be any other input device which is capable of providing a digital signal representative of an image to the CPU, for example, video tape or video laser disc.

The CPU 10 is also connected to a variety of output devices 32,34,36,38,40,42. These output devices are all appropriately connected to the central processing unit 10 by an appropriate data link system 13 as is well known in the prior art. For example, but not by way of limitation, by an Ethernet data link system. The output device 32, for instance, comprises an electrophotographic printer such as the Kodak Image Magic Heavy Stock Printer, sold by the Eastman Kodak Company, which takes the digital image and transfers the image onto a media which can then be used to produce transfers for use on garments. The output device 34 in the embodiment illustrated is a cathode-ray tube printer (CRT), in particular, the PCD 600 Printer, produced by the Eastman Kodak Company, which takes an image that is displayed on a cathode-ray tube and focuses it onto a photographic paper. Also provided is a thermal printer 36 for printing images onto thermal media. An example of a suitable thermal printer is the XLS 8600 Digital Thermal Color Printer, sold by the Eastman Kodak Company. In particular, printer 38 can be a thermal printer for providing transfers for use on T-shirts, whereas thermal printer 40 can be used for providing transfers for placement on mugs. The last output device 42 illustrated is an inkjet printer which can be used to imprint the merged image on greeting cards and the like. Various other devices may be provided for transferring onto various other formats such as garments, mugs, posters, banners, life-size cut-outs, holographic and 3-D imaging, balloons, pens, and pencils.

In the preferred embodiment illustrated, a server 44, such as the Power PC Apple Macintosh Computer, is used for managing information from the CPU and for appropriately providing information to the various printing devices associated therewith. Likewise, if so desired, additional computers may be provided in association with each of the input or output devices for managing information and providing further customizing features as deemed appropriate. For a more simplified system, the input and output devices may all be connected to a single computer. Also it is to be understood that any type suitable printing device may be employed for producing the image in the desired format, the present invention not being limited by the printing devices described herein.

Is to be understood that the CPU 10 may be provided with a monitor for viewing various screens for indicating the status of the system and available options for controlling and/or operating the system as is customarily done in the prior art. The CPU is also provided with an appropriate input device such as a keyboard, touchscreen, or pointing device as are well known in the prior art for allowing the operator to properly operate the system. Thus, the user, which may be the operator and/or customer, can also view the various images being input into the system and generated by the system so that the appropriate selections can be made by the user and/or customer. In the CPU there is stored a plurality of prestored images which may comprise a variety of artistic themes having at least one location for receiving a customer generated digital image. Any one of these prestored images may be selected and digitally merged with the customer generated image(s) captured by any of the input devices 12,14,16,16,20,22.

A more detailed description of the operation of the system disclosed in FIG. 1 is described in U.S. Pat. No. 5,459,819, which is hereby incorporated by reference in its entirety.

Figure 2:
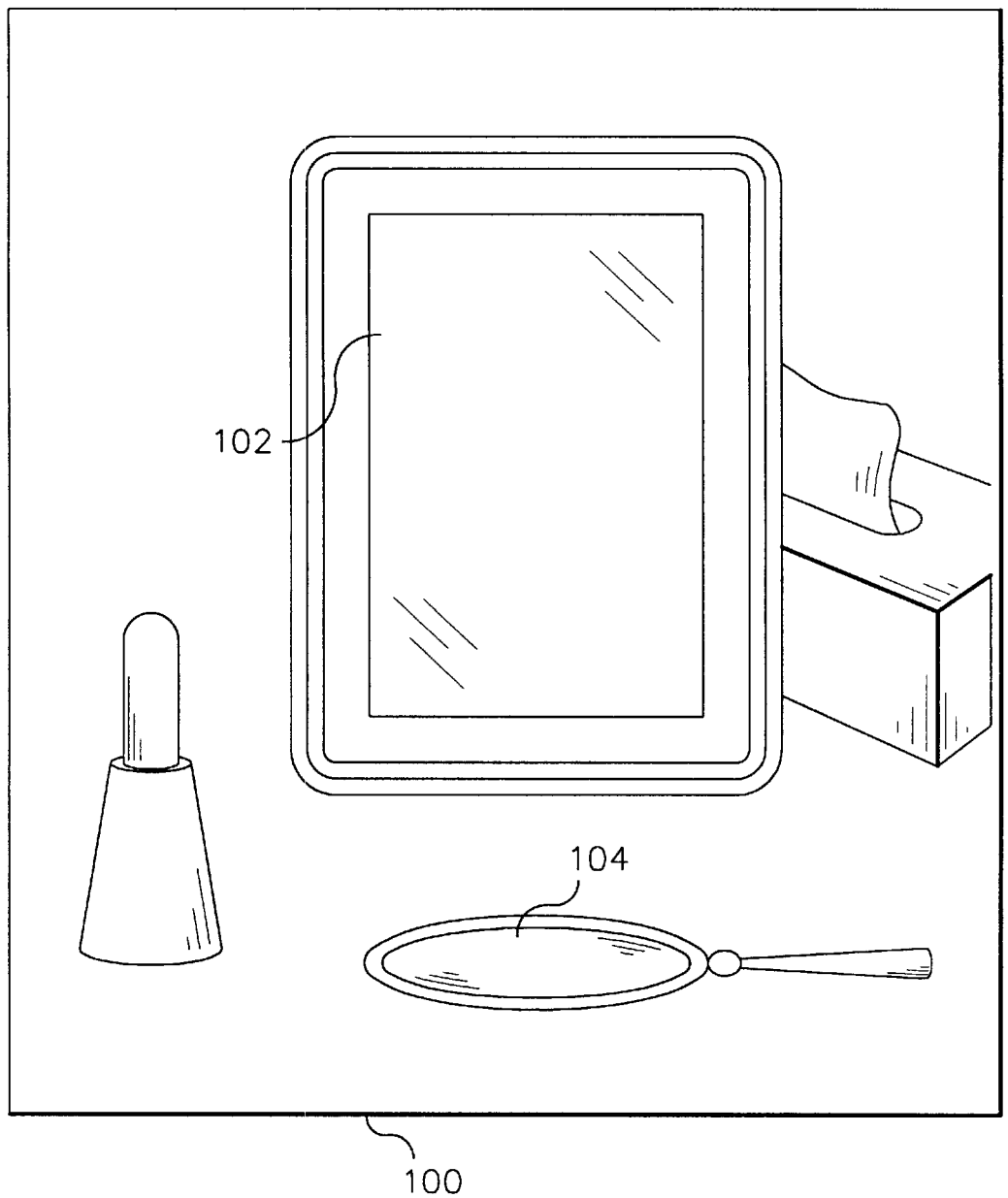
FIG. 2 illustrates an example of a prestored image having a single location for receiving a customer generated digital image.
Figure 3:
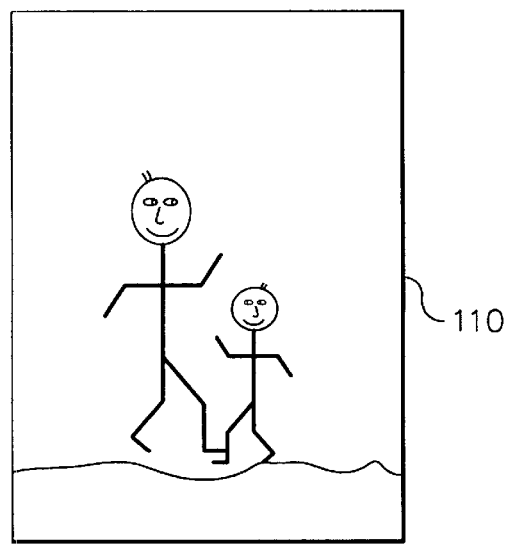
FIG. 3 is a customer generated digital image to be merged into the prestored image of FIG. 2.

Referring to FIG. 2, there is illustrated a digital prestored image 100 that has been stored in the memory of CPU 10. The prestored image 100, in the embodiment illustrated, has a pair of locations 102,104 where a customer generated digital image 110 (see FIG. 3) can be placed. In the embodiment illustrated, the prestored image 100 illustrates a picture frame 106 surrounding location 102 and a hand mirror 108 surrounds location 104. With regard to location 102, the customer generated image 110 is simply placed at the location. However, with regard to location 104, the image is automatically manipulated in accordance with a mathematical relationship, which was previously determined for location 104 and stored in the memory of the CPU so as to provide a particular visual effect. For example, the image 110 prior to placement at location 104 is manipulated by CPU 10 so as to obtain a mirror image. This can be done by modifying the image in accordance with appropriate mathematical relationships so that the image at location 104 will appear as a reflection of the image at location 102.

Figure 4:
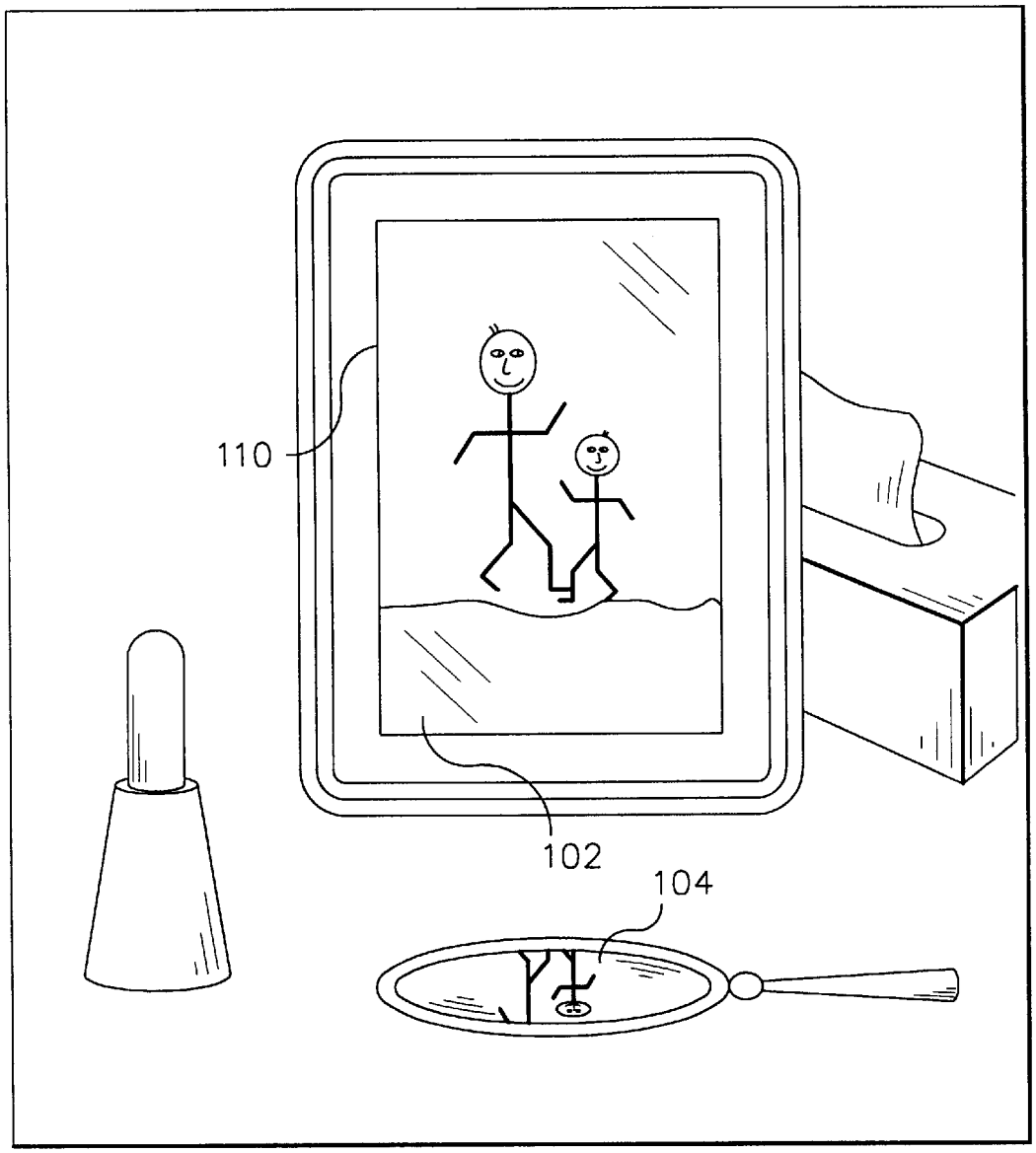
FIG. 4 illustrates the merging of the image of FIG. 3 at the two locations of the prestored image of FIG. 2.

Referring to FIG. 4 there is illustrated the merging of the customer generated digital image 110 into locations 102 and 104. As can be seen, the image 110 at location 102 is shown in its normal visual appearance whereas the image 110 at location 104 is shown as a reflected image from the mirror.

Figure 5:
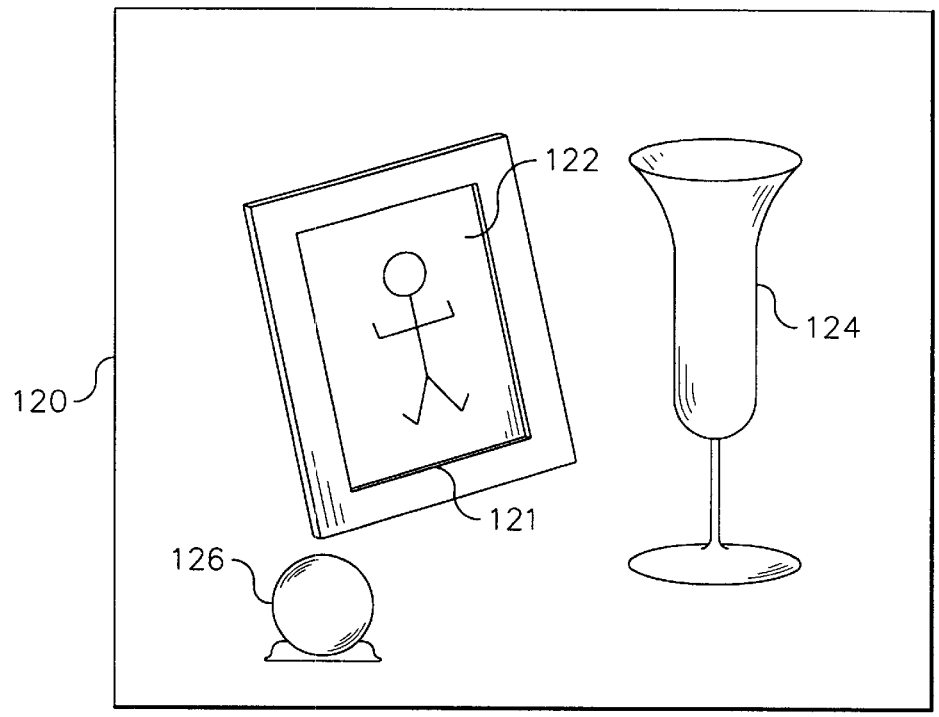
FIG. 5 illustrates a prestored image having a customer generated image placed at a predetermined location.

FIG. 5 illustrates a second prestored image 120 having a location 122 where a customer generated image 121 has been merged in accordance with the prior art. The prestored image is a scene which includes a picture frame around location 122, a reflective goblet 124, and a transmissive scene device 126 (for example, a water-filled souvenir often referred to as a "Snow Globe").

Figure 6:
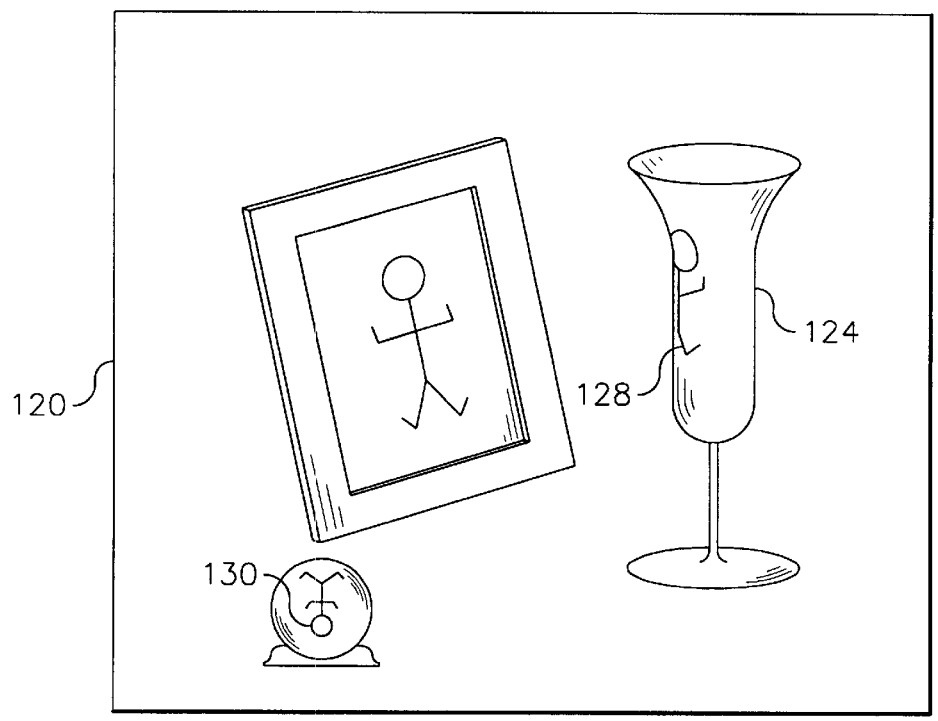
FIG. 6 is a view similar to FIG. 6 where two additional locations are provided for placement of the customer generated image as modified in accordance with the present invention.

Referring to FIG. 6, there is illustrated the prestored image 120 with two additional locations 128,130, each designed to receive modified customer image 121. In the particular embodiment illustrated, location 128 is located on the goblet 124 and is designed to display a reflected image of the customer generated image 121 at location 122, and location 130 is located at the device 126 and is designed to display an inverted transmissive image of the customer generated image 121 at location 122. This merged image gives an appearance that the customer generated image 121 is an integral part of the entire merged image.

Figure 7:
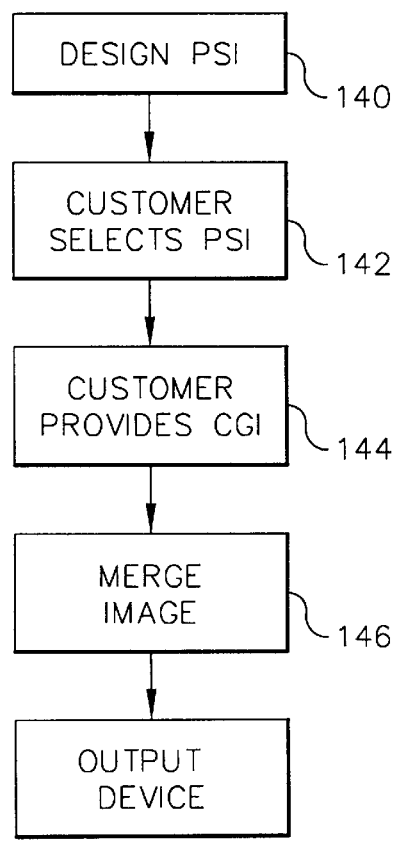
FIG. 7 is a block flow diagram of the method according to the present invention.

Referring to FIG. 7 there is illustrated a block flow diagram of the method according to the present invention. First, at step 140, a prestored digital image is designed with a first location for insertion of a customer generated image. Also at step 140, at least one additional location is provided for placement of an additional customer generated image. Image pixels at this additional location are defined mathematically with respect to the image at the first location so as to provide a particular visual effect. A customer would then select a PSI at step 142. Thereafter at step 144 at least one customer generated image (CGI) is provided. The CGI to be placed at the additional location is modified in accordance with mathematical relationships defined for the additional location. Once modified, the CGI image or images are merged with the PSI at step 146 and the merged image is then sent to an appropriate output device at step 148.

It is to be understood that various other changes and modifications may be made without departing from the scope of the present invention, the present invention being limited by the following claims. For example, mathematical relationships can be determined for light diffusion and/or overall directionality of the customer generated image.

Parts List

10 . . . central processing unit
11,13 . . . data link system
12,14,16,18,20,22 . . . input devices
32,34,36,38,40,42 . . . output devices
44 . . . server
100,120 . . . prestored image
102,104,122,128,130 . . . locations
106 . . . picture frame
108 . . . mirror
110,121 . . . customer generated digital image
124 . . . reflective goblet
126 . . . transmissive scene device
140,142,144,146,148 . . . step

We claim:

1. The method of combining at least one captured generated digital image with at least one prestored digital image, comprising the step of:

a) selecting a prestored digital image, said digital image having a predetermined location where a captured customer generated digital image may be placed, said location having a visual aspect as defined by a predetermined mathematical relationship with respect to said captured customer generated digital image, wherein said visual aspect comprises the reflection or transmissiveness of the customer generated digital image; and b) automatically modifying said captured customer generated image in accordance with said visual aspect as defined by said predetermined mathematical relationship and integrating said modified captured customer generated digital image into said prestored image at said predetermined location so as to form a merged digital image.

2. The method according to claim 1 further comprising the step of:

a) providing a capture means for obtaining at least one customer generated image in digital form;

b) providing an output means for printing, displaying, transmitting, or storing of an image; and c) forwarding said merged image to said output means.

3. The method of combining at least one capture generated digital image with a prestored digital image, comprising the step of:

a) selecting a prestored digital image, said digital image having a first and second predetermined location where a captured generated digital image may be placed, said first location having a visual aspect as defined by a predetermined mathematical relationship with respect to the second location, wherein said visual aspect comprises the reflection or transmissiveness of the customer generated digital image;

b) providing at least one capture means for obtaining at least one customer generated image in digital form;

c) providing at least one output means for printing, displaying, transmitting, or storing of an image;

d) automatically modifying said captured customer generated image in accordance with said visual aspect as defined by said predetermined mathematical relationship and integrating said modified captured customer generated digital image into said prestored image at said predetermined location so as to form a merged digital image; and e) forwarding said merged image to said output means.

4. The method of combining at least one captured generated digital image with a prestored digital image, comprising the step of:

a) selecting a prestored digital image, said digital image having a first predetermined location and second predetermined location where a digital image may be placed, said first location having a visual aspect as defined by a predetermined mathematical relationship with respect to the second location, wherein said visual aspect comprises the reflection or transmissiveness of the customer generated digital image;

b) providing a customer generated image for placement at said first and second locations; and c) automatically modifying said captured customer generated image in accordance with said visual aspect as defined by said predetermined mathematical relationship and integrating said modified captured customer generated digital image into said prestored image at said predetermined location so as to form a merged digital image.

5. The method of combining at least one captured generated digital image with at least one prestored digital image, comprising the step of:

a) selecting a prestored digital image, said digital image having a predetermined location where a captured generated digital image may be placed, said location having a visual aspect as defined by a predetermined mathematical relationship, wherein said visual aspect comprises the reflection or transmissiveness of the customer generated digital image;

b) providing a capture means for obtaining at least one customer generated image in digital form;

c) providing an output means for printing, displaying, transmitting, or storing of an image;

d) automatically modifying said captured customer generated image in accordance with said visual aspect as defined by said predetermined mathematical relationship and integrating said modified captured customer generated digital image into said prestored image at said predetermined location so as to form a merged digital image; and e) forwarding said merged image to said output means.

* * * * *